United States Patent
Roy-Faderman

(10) Patent No.: US 9,690,822 B2
(45) Date of Patent: Jun. 27, 2017

(54) SYSTEM AND METHOD FOR METADATA LEVEL VALIDATION OF CUSTOM SETUP OBJECTS

(71) Applicant: salesforce.com, inc., San Francisco, CA (US)

(72) Inventor: Avrom Roy-Faderman, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 534 days.

(21) Appl. No.: 13/889,981

(22) Filed: May 8, 2013

(65) Prior Publication Data

US 2013/0304713 A1 Nov. 14, 2013

Related U.S. Application Data

(60) Provisional application No. 61/644,525, filed on May 9, 2012.

(51) Int. Cl.
*G06F 17/30* (2006.01)
(52) U.S. Cl.
CPC ............... *G06F 17/30371* (2013.01)
(58) Field of Classification Search
CPC .................................... G06F 17/30371
USPC ............................................. 707/702
See application file for complete search history.

(56) References Cited

U.S. PATENT DOCUMENTS

| | | | | |
|---|---|---|---|---|
| 7,448,028 B2* | 11/2008 | Koutyrine | ............... | G06F 8/71 707/E17.007 |
| 7,721,259 B2* | 5/2010 | Heinke | ............... | G06F 9/44505 717/120 |
| 7,779,039 B2* | 8/2010 | Weissman | ......... | G06F 17/30595 707/793 |
| 7,926,030 B1* | 4/2011 | Harmon | ..................... | 717/121 |
| 8,407,235 B2* | 3/2013 | Hammer | ............... | G06Q 10/06 707/755 |
| 8,738,663 B2* | 5/2014 | Gonzalez | .......... | G06F 17/30306 707/694 |
| 9,047,070 B2* | 6/2015 | Roy-Faderman | ......... | G06F 8/24 |
| 2007/0136364 A1* | 6/2007 | Mejia | ..................... | G06F 9/548 |
| 2007/0168962 A1* | 7/2007 | Heinke et al. | ............... | 717/120 |
| 2013/0055211 A1* | 2/2013 | Fosback et al. | ............. | 717/126 |
| 2013/0117291 A1* | 5/2013 | Roy-Faderman | ......... | G06F 8/24 707/756 |
| 2013/0144918 A1* | 6/2013 | Said | .................... | G06Q 10/067 707/803 |
| 2013/0218898 A1* | 8/2013 | Raghavan et al. | ............ | 707/741 |
| 2014/0157225 A1* | 6/2014 | Roy-Faderman | ......... | G06F 8/00 717/100 |

* cited by examiner

*Primary Examiner* — Debbie Le
(74) *Attorney, Agent, or Firm* — Lorenz & Kopf, LLP

(57) ABSTRACT

In one embodiment, a computer-implemented method executable by a server system to validate metadata of an application is provided. The method includes: receiving a custom metametadata object having a definition that specifies a format of metadata of an object, and having validation rules that specify a use of the custom metametadata object; generating a metadata record using the custom metametadata object; building an application using the metadata record; and validating the metadata record based on the validation rules of the metametadata object.

16 Claims, 3 Drawing Sheets

SYSTEM AND METHOD FOR METADATA LEVEL VALIDATION OF CUSTOM SETUP OBJECTS

CROSS-REFERENCE TO RELATED APPLICATION

This application claims the benefit of U.S. provisional patent application Ser. No. 61/644,525, filed May 9, 2012, which is hereby incorporated by reference in its entirety.

TECHNICAL FIELD

Embodiments of the subject matter described herein relate generally to methods and systems for validating metadata in a computing environment.

BACKGROUND

Modern software development is evolving away from the client-server model toward network-based processing systems that provide access to data and services via the Internet or other networks. In contrast to traditional systems that host networked applications on dedicated server hardware, a "cloud" or "on demand" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

The cloud computing model can be used to develop the applications that are made available for use as a service. The applications may be built using metadata constructs provided by a particular platform. Platform developers and/or application developers may develop the metadata constructs to describe data and/or a format of data.

Accordingly, it is desirable to provide methods and products for validating the metadata. Furthermore, it is desirable to provide methods and products for validating the metadata before runtime of the application. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
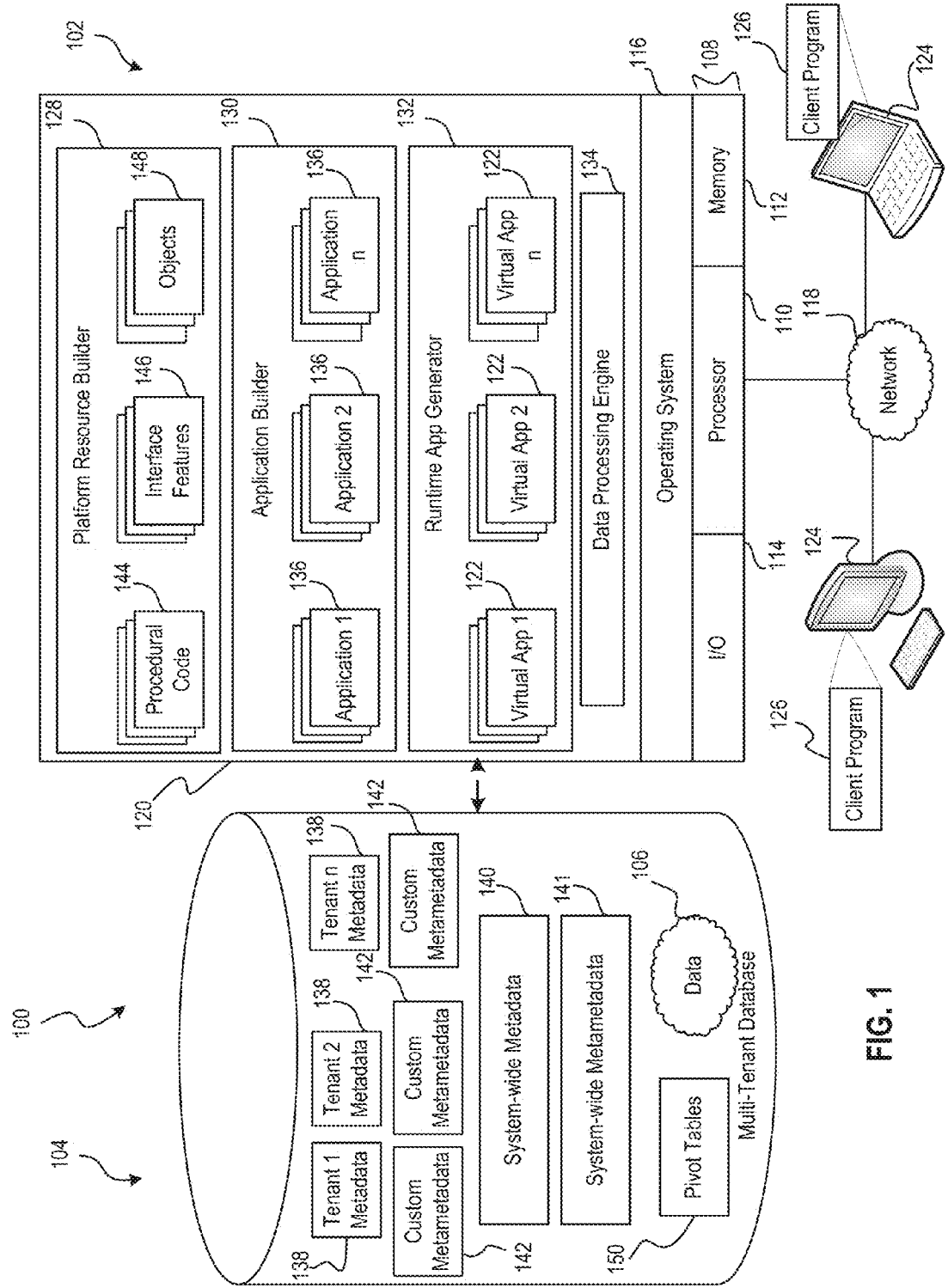
FIG. 1 is a functional block diagram illustrating an on demand, multi-tenant system including a metadata validation system in accordance with various embodiments.

The following detailed description is merely exemplary in nature and is not intended to limit the disclosure the application and uses of the disclosure. Furthermore, there is no intention to be bound by any expressed or implied theory presented in the preceding technical field, background, brief summary or the following detailed description. It should be understood that throughout the drawings, corresponding reference numerals indicate like or corresponding parts and features.

The exemplary embodiments presented herein relate to the validation of the use of custom metadata in a development environment. The described subject matter can be implemented in the context of any computer-implemented system, such as a software-based system, a database system, an on demand environment, or the like. Moreover, the described subject matter can be implemented in connection with two or more separate and distinct computer-implemented systems that cooperate and communicate with one another.

In accordance with exemplary embodiments described below, an on demand or cloud computer based system is provided, such as a multi-tenant system 100, that is used to develop and provide web applications and other applications to a plurality of different tenants, a plurality of different end users, and/or a plurality of different tenant applications. As will be discussed in more detail below, the applications may be developed using metadata records that are created using custom metadata objects that define a predefined metadata format (e.g., as described in U.S. patent application Ser. No. 13/569,113 filed on Aug. 7, 2012, which is hereby incorporated by reference in its entirety). For example, platform developers may create and make these custom metadata objects available to application developers via a platform. When creating the custom metadata objects, the platform developers associate validation rules with the custom metadata objects. The validation rules may be custom to the particular custom metadata object and can define rules for validating parts or fields of the object.

The application developers then build metadata records using the custom metadata objects and use the metadata records in the applications. When compiling the application, the particular use of the custom metadata objects is validated based on the validation rules associated with the custom metadata objects. Thus, validation results are presented to the application developer before runtime of the application, and any errors can be fixed prior to any use by end users.

Turning now to FIG. 1, the exemplary multi-tenant system 100 is shown to include a server 102 that is associated with a multi-tenant database 104. In accordance with various non-limiting examples, the system 100 may be implemented in the form of a multi-tenant customer relationship management system that can support any number of authenticated users of multiple tenants. A "tenant" or an "organization" generally refers to a group of users that shares access to common data 106 within the database 104. Tenants may represent customers, customer departments, business or legal organizations, and/or any other entities that maintain data for particular sets of users within the system 100. Tenants also represent system integrators or independent software vendors that develop functionality that can be packaged and distributed to other tenants. Although multiple tenants may share access to the server 102 and the database 104, the particular data and services provided from the server 102 to each tenant can be securely isolated from those provided to other tenants. The multi-tenant architecture therefore allows different sets of users to share functionality while managing the sharing of any or none of the data 106.

With initial reference to the server 102, the server 102, as shown, generally includes any sort of conventional processing hardware 108, such as a processor 110, memory 112, input/output features 114 and the like, that are managed and accessed by a suitable operating system 116. The processor 110 may be implemented using one or more of microprocessors, microcontrollers, processing cores and/or other computing resources spread across any number of distributed or integrated systems, including any number of "cloud-based" or other virtual systems. The memory 112 represents any non-transitory short or long term storage capable of storing programming instructions for execution on the processor 110, including any sort of random access memory (RAM), read only memory (ROM), flash memory, magnetic or optical mass storage, and/or the like. The input/output features 114 represent conventional interfaces to networks (e.g., to a network 118, or any other local area, wide area or other network), mass storage, display devices, data entry devices and/or the like. As can be appreciated, the server 102 may be implemented using a cluster of actual and/or virtual servers operating in conjunction with each other, typically in association with conventional network communications, cluster management, load balancing and other features as appropriate.

The server 102 typically includes or cooperates with some type of computer-readable media, where a tangible computer-readable medium has computer-executable instructions stored thereon. The computer-executable instructions, when read and executed by the server 102, cause the server 102 to perform certain tasks, operations, functions, and processes described in more detail herein. In this regard, the memory 112 may represent one suitable implementation of such computer-readable media. Alternatively or additionally, the server 102 could receive and cooperate with computer-readable media (not separately shown) that is realized as a portable or mobile component or platform, e.g., a portable hard drive, a USB flash drive, an optical disc, or the like.

The server 102, as shown, further includes an application platform 120 that may be any sort of software application or other data processing engine that generates virtual applications 122 that provide data and/or services to user devices 124. The virtual applications 122 are typically generated at run-time in response to queries received from user devices 124 (e.g., via a client program 126). The user devices 124 are typically operated by various tenants that subscribe to the system 100. The user devices 124 can be any sort of personal computer, mobile telephone, portable device, tablet computer, or other network-enabled user device 124 that communicates via the network 118.

In the illustrated embodiment, the application platform 120 includes a platform resources builder 128, an application builder 130, a runtime application generator 132, and a data processing engine 134. Each of these features may be implemented as a separate process or other module, and many equivalent embodiments could include different and/or additional features, components or other modules as desired.

The data processing engine 134 performs data processing operations on the data 106 such as uploads or downloads, updates, online transaction processing, and/or the like that are requested by a query generator, or a search engine associated with the virtual applications 122. The runtime application generator 132 dynamically builds and executes the virtual applications 122 in response to specific requests received from the user devices 124. For example, during operation, a user may operate a conventional browser or other client program 126 to contact the server 102 via the network 118. The user typically authenticates his or her identity to the server 102 to obtain a session identifier that identifies the user in subsequent communications with the server 102. When the identified user requests access to a virtual application 122, the runtime application generator 132 suitably creates the virtual application 122 at run time, as appropriate. The data processing engine 134 suitably obtains the requested data 106 from the database 104 as needed to populate tables, reports, interfaces, or other features of the particular virtual application 122. As can be appreciated, the virtual application 122 may contain Java, ActiveX, or other content that can be presented using conventional client software running on the user device 124; other embodiments may simply provide dynamic web or other content that can be presented and viewed by the user, as desired.

The virtual applications 122 created for the tenants are typically constructed in accordance with applications 136 which make use of tenant-specific metadata 138 and/or system-wide metadata 140, which describes the particular tables, reports, interfaces and/or other features of the particular application. The applications 136 make use of the tenant-specific metadata 138 and/or the system-wide metadata 140, which depends on custom metametadata 142 and/or system-wide metametadata 143, which define a format of the metadata 138. As will be discussed in more detail below, the custom metametadata 142 includes validation rules for validating metadata records that may be constructed using other metadata 138, 140 and the custom metametadata 142.

The application builder 130 builds the applications 136 that are used to generate the virtual applications 122. For example, the application builder 130 includes an interface that may be accessed by an application developer through the user device 124 to develop the applications 136. The applications 136 may be built using procedural code 144 that is either defined by that tenant or by a developer of custom metametadata 142 that the tenant has received (e.g., APIs, APEX, or other platform functions), and that makes use of the custom metametadata 142 and the tenant specific metadata 134 (including both that in a format specified by the custom metametadata 142 and that in a format specified by standard metadata) and/or the system-wide metadata 138. The applications 136 may further be based on interface features 146, such as tenant-specific screens, universal screens, or the like and tenant-specific and/or universal objects 148.

Once the application 146 is built and prior to use by the runtime application generator, the application builder 130 compiles the application 146. During compilation, and among other things, the use of the custom metametadata 142 in the application 136 is validated and results of the validation are presented to a user (e.g., the application developer).

The platform resource builder 128 builds the procedural code 144, the interface features 146, and/or the objects 148 that may be used to develop the applications 136. The platform resource builder 128 includes an interface that may be accessed by a platform developer through the user device 124 to build the procedural code 144, the interface features 146, and/or the objects 148. For example, a platform developer may build custom metametadata objects. The custom metametadata objects are built to include validation rules for validating the use of the custom metametadata with metadata. As can be appreciated, the validation rules may be provided in any language including but not limited to, a standard expression language such as Groovy or JSP Expression Language, a proprietary formula expression language, or procedural validation code. Once defined, the custom metametadata objects and the associated validation rules may be stored in the database 104 as the custom metametadata 142.

With reference now to the database 104, the database 104 is any sort of repository or other data storage system capable of storing and managing the data 106 associated with any number of tenants. The database 104 may be implemented using any type of conventional database server hardware. In various embodiments, the database 104 shares processing hardware 108 with the server 102. In other embodiments, the database 104 is implemented using separate physical and/or virtual database server hardware that communicates with the server 102 to perform the various functions described herein.

The data 106 may be organized and formatted in any manner to support the application platform 120. In various embodiments, the data 106 is suitably organized into a relatively small number of large data tables to maintain a semi-amorphous "heap"-type format. The data 106 can then be organized as needed for a particular virtual application 122. In various embodiments, conventional data relationships are established using any number of pivot tables 150 that establish indexing, uniqueness, relationships between entities, and/or other aspects of conventional database organization as desired.

As discussed above, data manipulation and report formatting for the virtual applications 133 is generally performed at run-time using a variety of the metadata constructs. The system-wide metadata 140, for example, can be used to describe any number of forms, reports, workflows, user access privileges, business logic and other constructs that are common to multiple tenants. The tenant-specific formatting, functions and other constructs may be maintained as tenant-specific metadata 138 for each tenant, as desired. Rather than forcing the data 106 into an inflexible global structure that is common to all tenants and applications, the database 106 is organized to be relatively amorphous, with the pivot tables 150 and the metadata 138, 140 providing additional structure on an as-needed basis. The custom metametadata 142 provides an additional layer of structure for the metatdata 138, 140. To that end, the application platform 120 suitably uses the pivot tables 150 and/or the metadata 138-142 to generate "virtual" components of the virtual applications 122 and to logically obtain, process, and present the relatively amorphous data 106 from the database 104.

Figure 2:
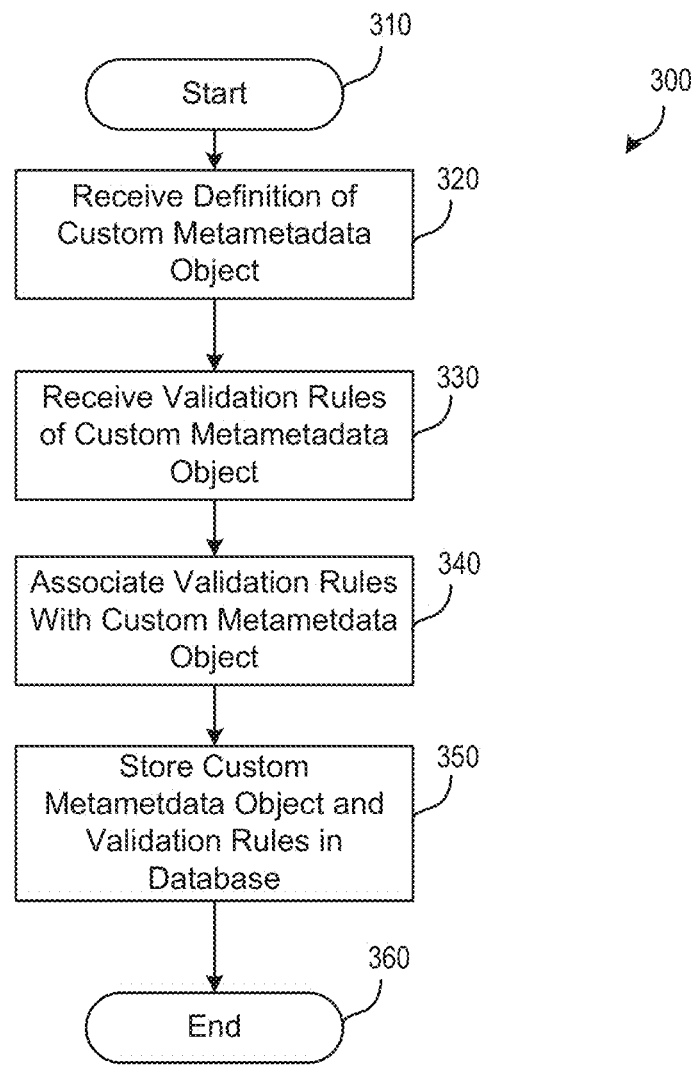
FIGS. 2 and 3 are flowcharts illustrating validation methods in accordance with various embodiments.
Figure 3:
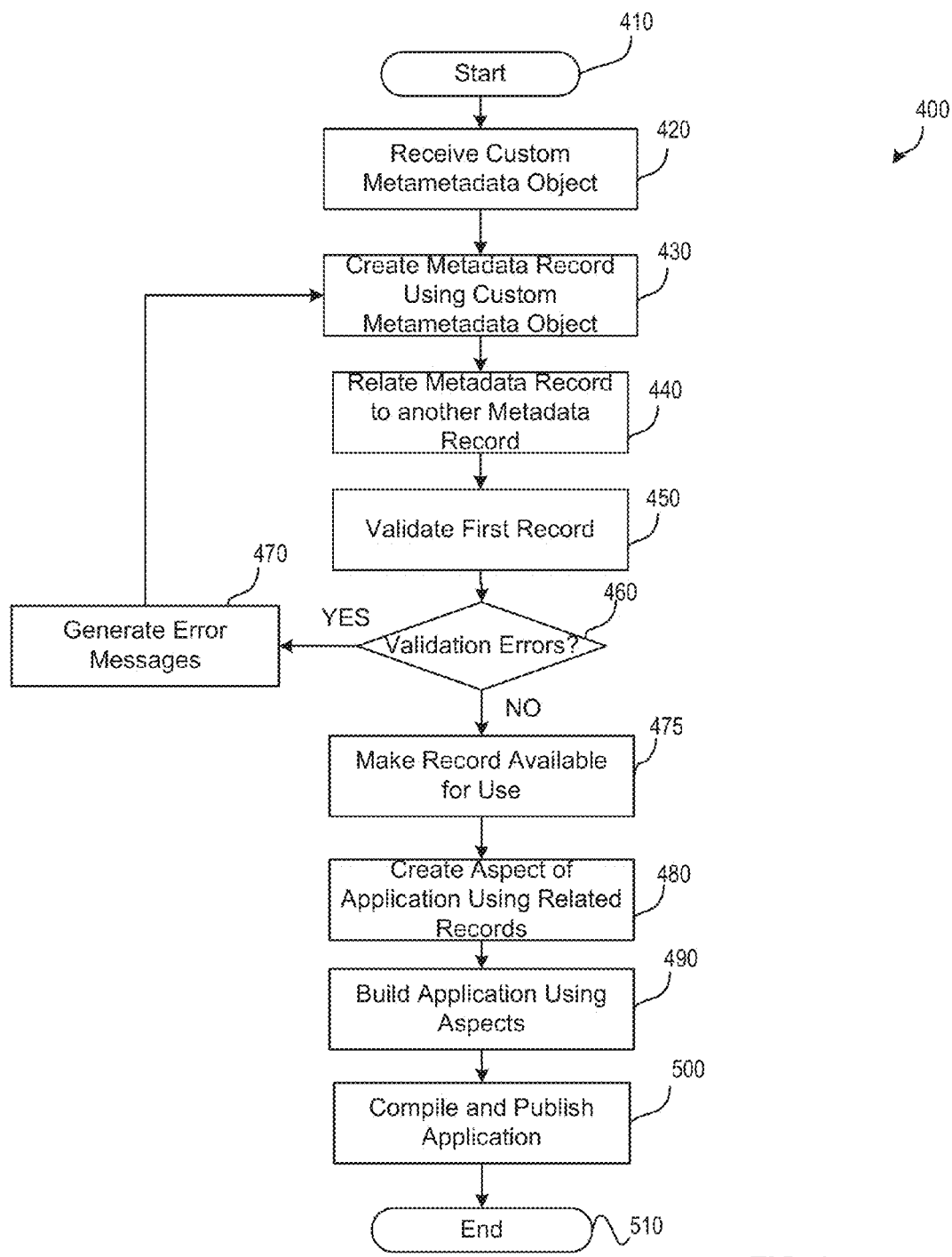

Turning now to FIGS. 2 and 3 and with continued reference to FIG. 1, flowcharts illustrate exemplary metametadata management methods. The various tasks performed in connection with the methods 300, 400 may be performed by software, hardware, firmware, or any combination thereof In other words, the methods 300, 400 may represent computer-implemented methods to manage metametadata in a multi-tenant environment or any other computer implemented environment. In particular, the methods, 300, 400 are executable by a suitably configured server system or a functional module of a server system, such as the platform resource builder 128 and/or the application builder 130 described above.

As can be appreciated, the methods 300, 400 may include any number of additional or alternative steps, the steps shown in FIGS. 2 and 3 need not be performed in the illustrated order, and the methods 300, 400 may be incorporated into a more comprehensive procedure or process having additional functionality not described in detail herein. Moreover, one or more of the steps shown in FIGS. 2 and 3 could be omitted from embodiments of the methods 300, 400 as long as the intended overall functionality remains intact.

The methods 300, 400 assume that the server 102 has already been provided with the modules and functionality described above.

With reference to FIGS. 2 and 3, methods 300 and 400 of managing metametadata are shown. In one example, as shown in FIG. 2, the method 300 is performed by the platform builder 128 to build custom metametadata objects and store them in the database 104 as custom metametadata 142. The method may begin at 310.

A definition of a custom object specifying a custom format for metadata is received (e.g., from a platform developer) at 320. The definition may include a name and a definition for configuring fields of a custom metametadata object. The name may be a name of the custom metametadata object, such as a unique name to be used for referencing the custom metametadata object. The definition may be any configuration of fields to be specified by the custom metametadata object, for use in creating metadata in accordance with the specification of the custom metametadata object.

Additionally, the definition includes a relationship between the custom metametadata object and at least one of a standard object (e.g., defined by a platform developer) that specifies a standard format for metadata and/or another custom metametadata object specifying another custom format for metadata. For example, the definition may include a relationship between the custom metametadata object and a field object. The field object may represent a format for a field, in one embodiment. Thus, the relationship may enable the metametadata object to specify particular fields of the field object type (e.g. having the format specified by the field object).

In the context of the present description, the custom metametadata object may be any container capable of being defined for specifying a custom format for metadata and capable of being defined to include a relationship to the standard object and/or other custom metametadata objects. For example, the custom metametadata object may be a record where the definition of the record includes data specifying the custom format of the metadata and further includes a reference to the standard object and/or other custom object.

Moreover, the metadata for which the custom format is specified by the custom metametadata object may be any descriptive data capable of being used to define at least one aspect of an application, as described in more detail below. It should be noted that the custom metametadata object may be defined in any manner that specifies the custom format for the metadata. In this way, the custom metametadata object may optionally specify the custom format that metadata is required to take. In various embodiments, only metadata created with reference to the custom metametadata object may be required to comply with the custom format specified by the custom metametadata object. Thus, different custom metametadata objects may be defined to specify different custom metadata formats, such that metadata referencing one of the custom objects is created in a custom format specified by that custom metametadata object.

In various embodiments, the definition of the custom metametadata object may include the relationship with the standard object defined by the platform provider of the database system that specifies the standard format for metadata. For example, the standard object may specify the standard format for fields, tables, columns, pages, etc. In this way, metadata defined according to the standard format may be standard metadata such as table definitions, column definitions, page definitions, etc. In other embodiments, the definition of the custom metametadata object may include the relationship with other custom metametadata objects specifying the other custom format for metadata.

In various embodiments, the definition of the custom metametadata object may include the aforementioned relationship(s) with the standard object or other custom metametadata object by including in the custom metametadata object a foreign key to the standard object or other custom metametadata object. The definition of the custom object may include the aforementioned relationship(s) with the standard object or other custom metametadata objects by using a junction object having a reference to both the custom metametadata object and the standard object or other custom metametadata object. In this way, the relationship may be a one-to-many relationship.

In various embodiments, in response to receipt of the definition of the custom object, additional information may be automatically included in the definition of the custom metametadata object (e.g. in accordance with predefined rules, etc.). Such additional information may be automatically included in the definition by the database system, in one embodiment. In another embodiment, the automatically included additional information may specify predetermined fields, such as a name field and a developer identifier field, as described in more detail below.

Additionally, as shown 330, validation rules are defined for the custom metametadata object. For example, a custom metametadata object which specifies that metadata objects constructed with it contain a relationship to a field, such that the relationship is called "TargetDateField," could be associated with a validation rule that specifies that the datatype of the associated field, for each metadata object constructed with reference to it, is indeed Date. As an example of the format of such rules, this rule could be defined with an expression "!{TargetDateField.type=date}". As another example, if the platform developer also wished to specify that the target field was itself a field on a custom object, the system could allow this as well, using a format such that this rule could be defined with the expression "!{TargetDateField.type=date && TargetDateField.Object.custom=true}".

The validation rules are associated with the custom metametadata object at 340 and the custom metametadata object having the definition and associated with the validation rules is stored at 350. In one embodiment, the custom object may be stored in the database system. In another embodiment, the custom object may be stored in a manner that allows other users of the database system to access the custom object (e.g. to create metadata having reference to the custom object). Thereafter, the method may end at 360.

In another example, as shown in FIG. 3, the method 400 is performed by the application builder to build an application 136 using the custom metametadata objects. The method may begin at 410.

A custom metametadata object specifying a custom format for metadata is received (e.g., based on a selection from an application developer) at 420. A first record is created according to the stored custom object which defines metadata according to the custom format at 430. For example, the first record may be a row in a table of a database, for example. Of course, however, the first record may be any structure created according to the stored custom metametadata object that defines metadata according to the custom format specified by the custom object.

In the exemplary embodiment described above where the custom metametadata object specifies the custom format of the metadata by specifying fields of the metadata, the first record may be created according to the custom format of the stored custom metametadata object by storing metadata (e.g. including values) for each of the fields specified by the custom metametadata object. In this way, the first record may be created to define metadata required by the custom metametadata object. As noted above, the first record may optionally be created according to the stored custom metametadata object by including in the record a reference to the stored custom metametadata object. As an alternative, the first record may be created according to the stored custom metametadata object using a user interface associated with the stored custom metametadata object.

At 440, the first record may optionally be related to a second record created according to the at least one of the standard object and another custom metametadata object. The second record may therefore be metadata created according to the standard object and/or the other custom metametadata object.

The first record may be related to the standard object and/or the other custom object based on the relationship included in the definition of the custom object. For example, the first record may be created to include the relationship as defined by the custom object. In one embodiment, a foreign key to the second record may be included in the first record. In another embodiment, a junction record created according to the aforementioned junction object may be created having a reference to both the first record and the second record.

At 450, once the first record is created, the first record is validated. During validation, the use of the metadata in the records is validated based on the validation rules associated with the custom metadata object (e.g., by a parser, a compiler, or other evaluation tool of the database system). For example, the validation rules are obtained from the custom metadata object, parsed, and applied to the metadata in the record.

If the metadata violates one or more validation rules at 460, a message may be generated for viewing by the application developer at 470. The message may indicate a particular violation of a particular validation rule, or may be more general and indicate a mere error in the use of the metadata. If an error exists, the method may proceed to creating or recreating the metadata record using the custom metametadata object at 430. If, however, the definition does not violate any of the validation rules at 460, the record may be made available for use in an application (e.g., by request from end user's of the system having access to the application) at 475.

At 480, at least one aspect of an application 136 is defined, using the metadata of the first record and the relationship of the first record and the second record. In various embodiments, the application 136 may be any code (e.g. procedural code, declarative expressions, declarative validations, etc.) having one or more aspects that are capable of being defined using the metadata of the first record and the related second record. Thus, the metadata of the first record and the related second record may be used to customize, create, etc. the application 136. Thus, the application 136 may not necessarily be a standalone business application, but may include procedural code with behaviors that are configurable using the metadata. For example, the application may be a toolkit of configurable behaviors.

In various embodiments, the application 136 may be a graphical user interface, such as a form with fields for receiving input by a user. With respect to such embodiment, a component of the graphical user interface (e.g. entry field, button, etc.) may be defined using the metadata by including for such component a reference to the first record having the metadata. Such metadata may describe the content to be included in the component of the graphical user interface, for example. To this end, the custom metametadata object may optionally relate to a component of a user interface, such as a visual component of the user interface. Such custom metametadata object may specify the custom format for the metadata to be defined for an instance of the component to be included in the application. The aspect of the application may accordingly implement the component of the user interface, for example, in accordance with the metadata of the first record formatted as specified by the custom metametadata object.

In another embodiment, the application 136 may be a backend application without an interface for a user, such as an application executed by another application which may or may not be a graphical user interface. With respect to such other embodiment, an aspect of the backend application (e.g. algorithm, etc.) may be defined using the metadata by including for such component a reference to the first record having the metadata. Such metadata may describe the input to the component of the backend application, for example.

In other embodiments, the aspect of the application may be defined by the application developer, such as by referencing the first record. For example, the application developer, by providing the first record having the metadata which is related to tenant metadata 138 created using system-wide metametadata 141 (e.g. also provided by the application developer), can create a functioning business application using the application (e.g. toolkit).

At 490, the application 136 is built using at least the aspect of step 450. Once the application 136 is built, the application 136 is compiled at 500 and published for execution thereof (e.g., by request from end user's of the system having access to the application). Thereafter, the method may end at 510.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer-implemented method executable by a server system to validate metadata of an application, the method comprising:
   receiving, by a processor, a custom metametadata object defined in response to inputs received from a user, wherein the custom metametadata object specifies a format of a metadata object that comprises data fields, and wherein the custom metametadata object also comprises validation rules that specify uses of the data fields of the metadata object;
   generating, by the processor, a metadata record according to the format specified in the custom metametadata object; and
   at the time that the metadata record is generated, validating, by the processor, the metadata record based on the validation rules of the metametadata object.

2. The computer-implemented method of claim 1 further comprising, selectively generating an error message based on the validating.

3. The computer-implemented method of claim 2, wherein the error message includes a message that indicates a generic violation of the use of the custom metametadata object.

4. The computer-implemented method of claim 1, wherein the error message includes a message that indicates a violation of a particular validation rule.

5. The computer-implemented method of claim 1, wherein the validating is performed before runtime of an application that incorporates the metadata record.

6. The computer-implemented method of claim 5, wherein the validating is performed by an evaluation tool of the server system.

7. The computer-implemented method of claim 1, further comprising relating the metadata record to another metadata record, and wherein the validating the metadata record is based on the metadata record and the another metadata record.

8. The computer-implemented method of claim 1, further comprising creating an aspect of an application using the metadata record, and building an application based on the aspect.

9. A multi-tenant server system for validating metadata of an application, comprising:
   a computer database that stores a custom metametadata object defined in response to inputs received from a user, wherein the custom metametadata object specifies a format of a metadata object that comprises data fields, and wherein the custom metametadata object also comprises validation rules that specify uses of the data fields of the metadata object;
   a server system that, by at least one processor, generates a metadata record according to the format specified in the custom metametadata object, and that validates the metadata record at the time that the metadata record is generated based on the validation rules of the metametadata object.

10. The multi-tenant server system of claim 9, wherein the server system selectively generates an error message based on the validating.

11. The multi-tenant server system of claim 10, wherein the error message includes a message that indicates a generic violation of the use of the custom metametadata object.

12. The multi-tenant server system of claim 9, wherein the error message includes a message that indicates a violation of a particular validation rule.

13. The multi-tenant server system of claim 9, wherein the server system validates the metadata record before runtime of an application incorporating the metadata record.

14. The multi-tenant server system of claim 13, wherein server system includes an evaluation tool that validates the metadata record.

15. The A multi-tenant server system of claim 9, wherein the server system relates the metadata record to another metadata record, and validates the metadata record based on the metadata record and the another metadata record.

16. A multi-tenant server system of claim 15, wherein the server system generates an aspect of an application using the metadata record, and builds an application based on the aspect.

* * * * *